US007482609B2

(12) United States Patent
Ershov et al.

(10) Patent No.: US 7,482,609 B2
(45) Date of Patent: Jan. 27, 2009

(54) LPP EUV LIGHT SOURCE DRIVE LASER SYSTEM

(75) Inventors: Alexander I. Ershov, San Diego, CA (US); Alexander N. Bykanov, San Diego, CA (US); Oleh Khodykin, San Diego, CA (US); Igor V. Fomenkov, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 503 days.

(21) Appl. No.: 11/217,161

(22) Filed: Aug. 31, 2005

(65) Prior Publication Data

US 2006/0192152 A1 Aug. 31, 2006

Related U.S. Application Data

(63) Continuation-in-part of application No. 11/174,299, filed on Jun. 29, 2005.

(51) Int. Cl.
*G01J 1/00* (2006.01)

(52) U.S. Cl. ............................... 250/504 R; 250/503.1; 250/492.1; 250/493.1; 378/119; 372/57; 372/39; 372/55; 372/73; 372/18

(58) Field of Classification Search ............. 250/504 R, 250/503.1, 492.1, 493.1, 49.1, 493.12; 378/119; 372/57, 39, 55, 73, 5, 18
See application file for complete search history.

(56) References Cited

U.S. PATENT DOCUMENTS 2,198,014 A * 4/1940 Ott ............................ 362/303
2,759,106 A 8/1956 Wolter ......................... 250/53

(Continued)

FOREIGN PATENT DOCUMENTS

JP 02-105478 4/1990

(Continued)

OTHER PUBLICATIONS

Andreev et al., "Enhancement of laser/EUV conversion by shaped laser pulse interacting with Li-contained targets for EUV lithography", Proc. of SPIE, 5196:128-136, (2004).

(Continued)

*Primary Examiner*—Jack I Berman
*Assistant Examiner*—Michael J Logie

(57) ABSTRACT

An apparatus and method is disclosed which may comprise a laser produced plasma EUV system which may comprise a drive laser producing a drive laser beam; a drive laser beam first path having a first axis; a drive laser redirecting mechanism transferring the drive laser beam from the first path to a second path, the second path having a second axis; an EUV collector optical element having a centrally located aperture; and a focusing mirror in the second path and positioned within the aperture and focusing the drive laser beam onto a plasma initiation site located along the second axis. The apparatus and method may comprise the drive laser beam is produced by a drive laser having a wavelength such that focusing on an EUV target droplet of less than about 100 μm at an effective plasma producing energy if not practical in the constraints of the geometries involved utilizing a focusing lens. The drive laser may comprise a $CO_2$ laser. The drive laser redirecting mechanism may comprise a mirror.

43 Claims, 8 Drawing Sheets

U.S. PATENT DOCUMENTS

| | | | | |
|---|---|---|---|---|
| 3,150,483 | A | 9/1964 | Mayfield et al. | 60/35.5 |
| 3,232,046 | A | 2/1966 | Meyer | 50/35.5 |
| 3,279,176 | A | 10/1966 | Boden | 60/202 |
| 3,746,870 | A | 7/1973 | Demarest | 250/227 |
| 3,960,473 | A | 6/1976 | Harris | 425/467 |
| 3,961,197 | A | 6/1976 | Dawson | 250/493 |
| 3,969,628 | A | 7/1976 | Roberts et al. | 250/402 |
| 4,042,848 | A | 8/1977 | Lee | 313/231.6 |
| 4,088,966 | A | 5/1978 | Samis | 313/231.5 |
| 4,143,275 | A | 3/1979 | Mallozzi et al. | 250/503 |
| 4,162,160 | A | 7/1979 | Witter | 75/246 |
| 4,203,393 | A | 5/1980 | Giardini | 123/30 |
| 4,223,279 | A | 9/1980 | Bradford, Jr. et al. | 331/94.5 |
| 4,364,342 | A | 12/1982 | Asik | 123/143 |
| 4,369,758 | A | 1/1983 | Endo | 123/620 |
| 4,455,658 | A | 6/1984 | Sutter et al. | 372/38 |
| 4,504,964 | A | 3/1985 | Cartz et al. | 378/119 |
| 4,507,588 | A | 3/1985 | Asmussen et al. | 315/39 |
| 4,534,035 | A | 8/1985 | Long | 372/85 |
| 4,536,884 | A | 8/1985 | Weiss et al. | 378/119 |
| 4,538,291 | A | 8/1985 | Iwamatsu | 378/119 |
| 4,550,408 | A | 10/1985 | Karning et al. | 372/58 |
| 4,561,406 | A | 12/1985 | Ward | 123/536 |
| 4,596,030 | A | 6/1986 | Herziger et al. | 378/119 |
| 4,618,971 | A | 10/1986 | Weiss et al. | 378/34 |
| 4,626,193 | A | 12/1986 | Gann | 431/71 |
| 4,633,492 | A | 12/1986 | Weiss et al. | 378/119 |
| 4,635,282 | A | 1/1987 | Okada et al. | 378/34 |
| 4,751,723 | A | 6/1988 | Gupta et al. | 378/119 |
| 4,752,946 | A | 6/1988 | Gupta et al. | 378/119 |
| 4,774,914 | A | 10/1988 | Ward | 123/162 |
| 4,837,794 | A | 6/1989 | Riordan et al. | 378/119 |
| 4,891,820 | A | 1/1990 | Rando et al. | 372/93 |
| 4,928,020 | A | 5/1990 | Birx et al. | 307/106 |
| 4,959,840 | A | 9/1990 | Akins et al. | 372/57 |
| 5,005,180 | A | 4/1991 | Edelman et al. | 372/57 |
| 5,023,884 | A | 6/1991 | Akins et al. | 372/57 |
| 5,023,897 | A | 6/1991 | Neff et al. | 378/122 |
| 5,025,445 | A | 6/1991 | Anderson et al. | 372/20 |
| 5,025,446 | A | 6/1991 | Kuizenga | 372/21 |
| 5,027,076 | A | 6/1991 | Horsley et al. | 324/674 |
| 5,070,513 | A | 12/1991 | Letardi | 372/83 |
| 5,102,776 | A | 4/1992 | Hammer et al. | 430/311 |
| 5,126,638 | A | 6/1992 | Dethlefsen | 315/326 |
| 5,142,166 | A | 8/1992 | Birx | 307/419 |
| 5,171,360 | A | 12/1992 | Orme et al. | 75/331 |
| 5,175,755 | A | 12/1992 | Kumakhov | 378/34 |
| 5,189,678 | A | 2/1993 | Ball et al. | 372/28 |
| 5,226,948 | A | 7/1993 | Orme et al. | 75/331 |
| 5,259,593 | A | 11/1993 | Orme et al. | 266/75 |
| 5,313,481 | A | 5/1994 | Cook et al. | 372/37 |
| 5,315,611 | A | 5/1994 | Ball et al. | 372/56 |
| 5,319,695 | A | 6/1994 | Itoh et al. | 378/84 |
| 5,340,090 | A | 8/1994 | Orme et al. | 266/202 |
| 5,359,620 | A | 10/1994 | Akins | 372/58 |
| RE34,806 | E | 12/1994 | Cann | 427/446 |
| 5,411,224 | A | 5/1995 | Dearman et al. | 244/53 |
| 5,448,580 | A | 9/1995 | Birx et al. | 372/38 |
| 5,471,965 | A | 12/1995 | Kapich | 123/565 |
| 5,504,795 | A | 4/1996 | McGeoch | 378/119 |
| 5,521,031 | A | 5/1996 | Tennant et al. | 430/5 |
| 5,729,562 | A | 3/1998 | Birx et al. | 372/38 |
| 5,763,930 | A | 6/1998 | Partlo et al. | 250/504 |
| 5,852,621 | A | 12/1998 | Sandstrom | 372/25 |
| 5,856,991 | A | 1/1999 | Ershov | 372/57 |
| 5,863,017 | A | 1/1999 | Larson et al. | 248/176.1 |
| 5,866,871 | A | 2/1999 | Birx | 219/121 |
| 5,894,980 | A | 4/1999 | Orme-Marmarelis et al. | 228/33 |
| 5,894,985 | A | 4/1999 | Orme-Marmarelis et al. | 228/262 |
| 5,936,988 | A | 8/1999 | Partlo et al. | 372/38 |
| 5,938,102 | A | 8/1999 | Muntz et al. | 228/102 |
| 5,953,360 | A | 9/1999 | Vitruk et al. | 372/87 |
| 5,963,616 | A | 10/1999 | Silfvast et al. | 378/122 |
| 5,970,076 | A | 10/1999 | Hamada | 372/20 |
| 5,978,394 | A | 11/1999 | Newman et al. | 372/32 |
| 5,991,324 | A | 11/1999 | Knowles et al. | 372/57 |
| 6,005,879 | A | 12/1999 | Sandstrom et al. | 372/25 |
| 6,016,325 | A | 1/2000 | Ness et al. | 372/38 |
| 6,018,537 | A | 1/2000 | Hoffman et al. | 372/25 |
| 6,028,880 | A | 2/2000 | Carlesi et al. | 372/58 |
| 6,031,241 | A | 2/2000 | Silfvast et al. | 250/504 |
| 6,031,598 | A * | 2/2000 | Tichenor et al. | 355/67 |
| 6,039,850 | A | 3/2000 | Schulz | 204/192.15 |
| 6,051,841 | A | 4/2000 | Partlo | 250/504 |
| 6,064,072 | A | 5/2000 | Partlo et al. | 250/504 |
| 6,067,311 | A | 5/2000 | Morton et al. | 372/57 |
| 6,094,448 | A | 7/2000 | Fomenkov et al. | 372/102 |
| 6,104,735 | A | 8/2000 | Webb | 372/37 |
| 6,128,323 | A | 10/2000 | Myers et al. | 372/38.1 |
| 6,151,346 | A | 11/2000 | Partlo et al. | 372/38 |
| 6,151,349 | A | 11/2000 | Gong et al. | 372/58 |
| 6,164,116 | A | 12/2000 | Rice et al. | 73/1.72 |
| 6,172,324 | B1 | 1/2001 | Birx | 219/121.57 |
| 6,186,192 | B1 | 2/2001 | Orme-Marmarelis et al. | 141/18 |
| 6,192,064 | B1 | 2/2001 | Algots et al. | 372/99 |
| 6,195,272 | B1 | 2/2001 | Pascente | 363/21 |
| 6,208,674 | B1 | 3/2001 | Webb et al. | 372/57 |
| 6,208,675 | B1 | 3/2001 | Webb | 372/58 |
| 6,219,368 | B1 | 4/2001 | Govorkov | 372/59 |
| 6,224,180 | B1 | 5/2001 | Pham-Van-Diep et al. | 347/2 |
| 6,228,512 | B1 | 5/2001 | Bajt et al. | 428/635 |
| 6,240,117 | B1 | 5/2001 | Gong et al. | 372/58 |
| 6,264,090 | B1 | 7/2001 | Muntz et al. | 228/33 |
| 6,276,589 | B1 | 8/2001 | Watts, Jr. et al. | 228/33 |
| 6,285,743 | B1 | 9/2001 | Kondo et al. | 378/119 |
| 6,307,913 | B1 | 10/2001 | Foster et al. | 378/34 |
| 6,317,448 | B1 | 11/2001 | Das et al. | 372/32 |
| 6,339,634 | B1 * | 1/2002 | Kandaka et al. | 378/119 |
| 6,359,922 | B1 | 3/2002 | Partlo et al. | 372/58 |
| 6,370,174 | B1 | 4/2002 | Onkels et al. | 372/38.04 |
| 6,377,651 | B1 | 4/2002 | Richardson et al. | 378/34 |
| 6,381,257 | B1 | 4/2002 | Ershov et al. | 372/57 |
| 6,392,743 | B1 | 5/2002 | Zambon et al. | 355/69 |
| 6,396,900 | B1 | 5/2002 | Barbee, Jr. et al. | 378/84 |
| 6,404,784 | B2 | 6/2002 | Komine | 372/9 |
| 6,414,979 | B2 | 7/2002 | Ujazdowski et al. | 372/87 |
| 6,442,181 | B1 | 8/2002 | Oliver et al. | 372/25 |
| 6,449,086 | B1 | 9/2002 | Singh | 359/361 |
| 6,452,194 | B2 | 9/2002 | Bijkerk et al. | 250/492.2 |
| 6,452,199 | B1 | 9/2002 | Partlo et al. | 250/504 |
| 6,466,602 | B1 | 10/2002 | Fleurov et al. | 372/87 |
| 6,477,193 | B2 | 11/2002 | Oliver et al. | 372/58 |
| 6,491,737 | B2 | 12/2002 | Orme-Marmerelis et al. | 75/335 |
| 6,493,374 | B1 | 12/2002 | Fomenkov et al. | 372/102 |
| 6,493,423 | B1 | 12/2002 | Bisschops | 378/119 |
| 6,504,903 | B1 * | 1/2003 | Kondo et al. | 378/119 |
| 6,520,402 | B2 | 2/2003 | Orme-Marmerelis et al. | 228/260 |
| 6,529,531 | B1 | 3/2003 | Everage et al. | 372/20 |
| 6,532,247 | B2 | 3/2003 | Spangler et al. | 372/61 |
| 6,535,531 | B1 | 3/2003 | Smith et al. | 372/25 |
| 6,538,737 | B2 | 3/2003 | Sandstrom et al. | 356/334 |
| 6,549,551 | B2 | 4/2003 | Ness et al. | 372/38.07 |
| 6,562,099 | B2 | 5/2003 | Orme-Marmerelis et al. | 75/335 |
| 6,566,667 | B1 | 5/2003 | Partlo et al. | 250/504 |
| 6,566,668 | B2 | 5/2003 | Rauch et al. | 250/504 |
| 6,567,450 | B2 | 5/2003 | Myers et al. | 372/55 |
| 6,576,912 | B2 | 6/2003 | Visser et al. | 250/492.2 |
| 6,580,517 | B2 | 6/2003 | Lokai et al. | 356/519 |
| 6,584,132 | B2 | 6/2003 | Morton | 372/57 |
| 6,586,757 | B2 * | 7/2003 | Melnychuk et al. | 250/504 R |
| 6,590,959 | B2 * | 7/2003 | Kandaka et al. | 378/119 |
| 6,621,846 | B1 | 9/2003 | Sandstrom et al. | 372/57 |

| | | | | |
|---|---|---|---|---|
| 6,625,191 | B2 | 9/2003 | Knowles et al. | 372/55 |
| 6,647,086 | B2 | 11/2003 | Amemiya et al. | 378/34 |
| 6,656,575 | B2 | 12/2003 | Bijkerk et al. | 428/212 |
| 6,671,294 | B2 | 12/2003 | Kroyan et al. | 372/20 |
| 6,690,764 | B2 * | 2/2004 | Kondo | 378/119 |
| 6,721,340 | B1 | 4/2004 | Fomenkov et al. | 372/25 |
| 6,724,462 | B1 | 4/2004 | Singh et al. | 355/53 |
| 6,744,060 | B2 | 6/2004 | Ness et al. | 315/111.01 |
| 6,757,316 | B2 | 6/2004 | Newman et al. | 372/57 |
| 6,780,496 | B2 | 8/2004 | Bajt et al. | 425/216 |
| 6,782,031 | B1 | 8/2004 | Hoffman et al. | 372/90 |
| 6,795,474 | B2 | 9/2004 | Partlo et al. | 372/57 |
| 6,804,327 | B2 | 10/2004 | Schriever et al. | 378/119 |
| 6,815,700 | B2 | 11/2004 | Melnyhchuk et al. | 250/504 |
| 6,822,251 | B1 * | 11/2004 | Arenberg et al. | 250/504 R |
| 6,862,339 | B2 * | 3/2005 | Richardson | 378/119 |
| 6,865,255 | B2 | 3/2005 | Richardson | 378/119 |
| 7,122,814 | B2 * | 10/2006 | Hergenhan et al. | 250/504 R |
| 7,312,462 | B2 * | 12/2007 | Singer et al. | 250/492.2 |
| 7,323,703 | B2 * | 1/2008 | Oliver et al. | 250/504 R |
| 7,399,981 | B2 * | 7/2008 | Cheymol et al. | 250/504 R |
| 2001/0055364 | A1 | 12/2001 | Kandaka et al. | 378/119 |
| 2002/0006149 | A1 | 1/2002 | Spangler et al. | 372/61 |
| 2002/0012376 | A1 | 1/2002 | Das et al. | 372/57 |
| 2002/0044629 | A1 * | 4/2002 | Hertz et al. | 378/119 |
| 2002/0048288 | A1 | 4/2002 | Kroyan et al. | 372/20 |
| 2002/0094063 | A1 * | 7/2002 | Nishimura et al. | 378/119 |
| 2002/0100882 | A1 | 8/2002 | Partlo et al. | 250/504 |
| 2002/0101589 | A1 | 8/2002 | Sandstrom et al. | 356/334 |
| 2002/0105994 | A1 | 8/2002 | Partlo et al. | 372/57 |
| 2002/0114370 | A1 | 8/2002 | Onkels et al. | 372/55 |
| 2002/0163313 | A1 | 11/2002 | Ness et al. | 315/111.01 |
| 2002/0168049 | A1 * | 11/2002 | Schriever et al. | 378/119 |
| 2003/0006383 | A1 | 1/2003 | Melnychuk et al. | 250/504 |
| 2003/0068012 | A1 | 4/2003 | Ahmad et al. | 378/119 |
| 2003/0196512 | A1 | 10/2003 | Wyszomierski et al. | 75/336 |
| 2003/0219056 | A1 | 11/2003 | Yager et al. | 372/57 |
| 2004/0047385 | A1 | 3/2004 | Knowles et al. | 372/55 |
| 2004/0057475 | A1 * | 3/2004 | Frankel et al. | 372/25 |
| 2004/0223531 | A1 * | 11/2004 | Arenberg | 372/76 |
| 2004/0238762 | A1 * | 12/2004 | Mizoguchi et al. | 250/504 R |
| 2005/0098741 | A1 * | 5/2005 | Bakker et al. | 250/492.2 |
| 2005/0147147 | A1 * | 7/2005 | Umstadter et al. | 372/73 |
| 2005/0205803 | A1 * | 9/2005 | Mizoguchi | 250/492.2 |
| 2005/0225739 | A1 * | 10/2005 | Hiura | 355/67 |
| 2006/0039435 | A1 * | 2/2006 | Cheymol et al. | 372/55 |
| 2006/0222034 | A1 * | 10/2006 | Ujazdowski et al. | 372/57 |
| 2006/0237668 | A1 * | 10/2006 | Silverman et al. | 250/492.1 |

FOREIGN PATENT DOCUMENTS

| | | |
|---|---|---|
| JP | 03-173189 | 7/1991 |
| JP | 06-053594 | 2/1994 |
| JP | 09-219555 | 8/1997 |
| JP | 2000-058944 | 2/2000 |
| JP | 2000091096 A | 3/2000 |

OTHER PUBLICATIONS

Apruzese, "X-ray laser research using Z pinches", Am. Inst. Of Phys. 399-403, (1994).

Bal et al., "Optimizing multiplayer coatings for extreme UV projection systems", Faculty of Applied Sciences, Delft University of Technology.

Bollanti et al., "Compact three electrodes excimer laser IANUS for a POPA optical system", SPIE Proc. (2206) 144-153, (1994).

Bollanti et al., "Ianus, the three-electrode excimer laser," App. Phys. B (Lasers & Optics) 66(4):401-406, (1998).

Braun et al., "Multi-component EUV Multilayer Mirrors", Proc. SPIE, 5037:2-13, (2003).

Choi et al., "A $10^{13}$ A/s high energy density micro discharge radiation source", B. Radiation Characteristics, p. 287-290.

Choi et al., "Fast pulsed hollow cathode capillary discharge device", Rev. of Sci. Instrum. 69(9):3118-3122 (1998).

Choi et al., "Temporal development of hard and soft x-ray emission from a gas-puff Z pinch", Rev. Sci. Instrum. 57(8), pp. 2162-2164 (Aug. 1986).

Eckhardt et al., "Influence of doping on the bulk diffusion of Li into Si(100)", Surface Science 319 (1994) 219-223.

Eichler et al., "Phase conjugation for realizing lasers with diffraction limited beam quality and high average power", Techninische Universitat Berlin, Optisches Institut, (Jun. 1998).

Fedosejevs et al., "Subnanosecond pulses from a KrF laser pumped $SF_6$ brillouin amplifier", IEEE J. QE 21, 1558-1562 (1985).

Feigl et al., "Heat Resistance of EUV multiplayer mirrors for long-time applications", Microelectric Engineering, 57/58:3-8, (2001).

Fomenkov et al., "Characterization of a 13.5 nm source for EUV lithography based on a dense plasma focus and lithium emission", Sematech Intl. Workshop on EUV Lithography (Oct. 1999).

Giordano et al., "Magnetic pulse compressor for prepulse discharge in spiker-sustainer excitati technique for XeC1 lasers", Rev. Sci. Instrum 65(8), pp. 2475-2481 (Aug. 1994).

Hansson et al., "Xenon liquid jet laser-plasma source for EUV lithography," Emerging Lithographic Technologies IV, Proc. of SPIE, vol. 3997:729-732 (2000).

Hercher, "Tunable single mode operation of gas lasers using intracavity tilted etalons," Applied Optics, vol. 8, No. 6, Jun. 1969, pp. 1103-1106.

Jahn, Physics of electric propulsion, McGraw-Hill Book Company, (series in Missile and Space U.S.A.), Chap. 9, "Unsteady Electromagnetic Acceleration", p. 257 (1968).

Jiang et al., "Compact multimode pumped erbium-doped phosphate fiber amplifiers," Optical Engineering, vol. 42, Issue 10, pp. 2817-2820 (Oct. 2003).

Kato, "Electrode lifetimes in a plasma focus soft x-ray source", J. Appl. Phys. (33) pt. 1, No. 8:4742-4744 (1991).

Kato et al., "Plasma focus x-ray source for lithography", Am. Vac. Sci. Tech. B., 6(1): 195-198 (1988).

Kjornrattanawanich, Ph.D., Dissertation, U.S. Department of energy, Lawrence Livermore National Laboratory, Sep. 1, 2002.

Kloidt et al., "Enhancement of the reflectivity of Mo/Si multiplayer x-ray mirrors by thermal treatment", Appl. Phys. Lett. 58(23), 2601-2603 (1991).

Kuwahara et al., "Short-pulse generation by saturated KrF laser amplification of a steep Stokes pulse produced by two-step stimulated Brillouin scattering", J. Opt. Soc. Am. B 17, 1943-1947 (2000).

Lange et al., "High gain coefficient phosphate glass fiber amplifier", NFOEC 2003, paper No. 126.

Lebert et al., "Soft x-ray emission of laser-produced plasmas using a low-debris cryogenic nitrogen target", J. App. Phys. 84(6):3419-3421 (1998).

Lebert et al., "A gas discharged based radiation source for EUV-lithography", Intl. Conf. Micro and Nano-Engineering 98 (Sep. 22-24, 1998) Leuven Belgium.

Lebert et al., "Investigation of pinch plasmas with plasma parameters promising ASE", Inst. Phys. Conf. Ser No. 125: Section 9, pp. 411-415 (1992) Schiersee, Germany.

Lebert et al., "Comparison of laser produced and gas discharge based EUV sources for different applications", Intl. Conf. Micro- Nano-Engineering 98 (Sep. 22-24, 1998) Leuven Belgium.

Lee, "Production of dense plasmas in hypocycloidal pinch apparatus", The Phys. of Fluids, 20(2):313-321 (1977).

Lewis, "Status of Collision-Pumped X-Ray Lasers", Am. Inst. Phys. pp. 9-16 (1994).

Lowe, "Gas plasmas yield x-rays for lithography", Electronics, pp. 40-41 (Jan. 27, 1982).

Malmqvuist et al., "Liquid-jet target for laser-plasma soft x-ray generation", Am. Inst. Phys. 67(12):4150-4153 (1996).

Mather, "Formation of a high-density deuterium plasma focus", Physics of Fluids, 8(2), 366-377 (Feb. 1965).

Mather et al., "Stability of the dense plasma focus," Phys. of Fluids, 12(11):2343-2347 (1969).

Matthews et al., "Plasma sources for x-ray lithography", SPIE, vol. 333 Submicron Lithography, pp. 136-139 (1982).

Mayo et al., "A magnetized coaxial source facility for the generation of energetic plasma flows," Sci. Technol. vol. 4 pp. 47-55 (1994).

Mayo et al., "Initial results on high enthalpy plasma generation in a magnetized coaxial source", Fusion Tech vol. 26:1221-1225 (1994).
Mitsuyama et al., "Compatibility of insulating ceramic materials with liquid breeders," Fusion Eng. And Design 39-40 (1998) 811-817.
Montcalm et al., "Mo/Y multiplayer mirrors for the 8-12 nm wavelength region", Optics Letters, 19(15): 1173-1175 (Aug. 1, 1994).
Montcalm et al., "In situ reflectance measurements of soft-s-ray/extreme-ultraviolet Mo/Y multiplayer mirrors", Optics Letters 20(12): 1450-1452 (Jun. 15, 1995).
Nilsen et al., "Mo:Y multiplayer mirror technology utilized to image the near-field output of a Ni-like Sn laser at 11.9 nm", Optics Letters, 28(22) 2249-2251 (Nov. 15, 2003).
Nilsen et al., "Analysis of resonantly photopumped Na-Ne x-ray laser scheme," Am Phys. Soc. 44(7):4591-4597 (1991).
H. Nishioka et al., "UV saturable absorber for short-pulse KrF laser systems", Opt. Lett. 14, 692-694 (1989).
Orme et al., "Electrostatic charging and deflection of nonconventional droplet streams formed from capillary stream breakup", Physics of Fluids, 12(9):2224-2235, (Sep. 2000).
Orme et al., "Charged molten metal droplet deposition as a direct write technology", MRS 2000 Spring Meeting, San Francisco, (Apr. 2000).
Pant et al., "Behavior of expanding laser produced plasma in a magnetic field", Physica Sripta, T75:104-111, (1998).
Partlo et al., "EUV (13.5) light generation using a dense plasma focus device," SPIE Proc. on Emerging Lithographic Technologies III, vol. 3676, 846-858 (Mar. 1999).
Pearlman et al., "X-ray lithography using a pulsed plasma source", J. Vac. Sci Technol., pp. 1190-1193 (Nov./Dec. 1981).
Pint et al., "High temperature compatibility issues for fusion reactor structural materials," Metals and Ceramics Division, Oak Ridge National Laboratory, P.O. Box 2008, Oak Ridge, TN 37831-6156.
Porter et al., "Demonstration of population inversion by resonant photopumping in a neon gas cell irradiated by a sodium Z pinch", Phys. Rev. Let., 68(6):796-799, (Feb. 1992).
Price, "X-ray microscopy using grazing incidence reflection optics," Am. Inst. Phys., pp. 189-199, (1981).
Qi et al., "Fluorescence in Mg IX emission at 48.340 Å from Mg pinch plasmas photopumped by A1 XI line radiation at 78.338 Å", The Am. Phys. Soc. 47(3):2253-2263 (Mar. 1993).
Sae-Lao et al., "Performance of normal-incidence molybdenum-ytrium multiplayer-coated diffraction grating at a wavelength of 9 mm", Applied Optics, 41(13):2394-1400 (May 1, 2002).
Sae-Lao et al., "Molybdenum-strontium multiplayer mirrors for the 8-12 nm extreme ultraviolet wavelength region", Optics Letters, 26(7):468-470, (Apr. 1, 2001).
Sae-Lao et al., "Normal-incidence multiplayer mirrors for the 8-12 nm wavelength region", Information Science and Technology, Lawrence Livermore National Laboratory.
Sae-Lao et al., "Measurements of the refractive index of yttrium in the 50-1300-eV energy region", Applied Optics, 41(34):7309-7316 (Dec. 1, 2002).
Scheuer et al., "A magnetically-nozzled, quasi-steady, multimegawatt, coaxial plasma thruster," IEEE Transactions on Plasma Science, 22(6) (Dec. 1994).
Schiemann et al., "Efficient temporal compression of coherent nanosecond pulses in a compact SBS generator-amplifier setup", IEEE J. QE 33, 358-366 (1997).
Schriever et al., "Laser-produced lithium plasma as a narrow-band extended ultraviolet radiation source for photoelectron spectroscopy", App. Optics, 37(7):1243-1248, (Mar. 1998).
Schriever et al., "Narrowband laser produced extreme ultraviolet sources adapted to silicon/molybdenum multiplayer optics", J. of App. Phys. 83(9):4566-4571, (May 1998).
Sharafat et al., Coolant structural materials compatibility, Joint APEX electronic meeting, UCLA, (Mar. 24, 2000).
Shiloh et al., "Z pinch of a gas jet", Physical Review Lett., 40(8), pp. 515-518 (Feb. 20, 1978).
Silfvast et al., "High-power plasma discharge source at 13.5 nm and 11.4 nm for EUV lithography", SPIE, vol. 3676:272-275, (Mar. 1999).
Silfvast et al., "Lithium hydride capillary discharge creates x-ray plasma at 13.5 nanometers", Laser Focus World, p. 13. (Mar. 1997).
Singh et al., "Improved theoretical reflectivities of extreme ultraviolet mirrors", Optics Research Group, Faculty of Applied Sciences, Delft University of Technology.
Singh et al., "Design of multiplayer extreme-ultraviolet mirrors for enhanced reflectivity", Applied Optics, 39(13):2189-2197 (May 1, 2000).
Soufi et al., "Absolute photoabsorption measurements of molybdenum in the range 60-930 eV for optical constant determination", Applied Optics 37(10):1713-1719 (Apr. 1, 1998).
Srivastra et al., "High-temperature studies on Mo-Si multiplayers using transmission electron microscope", Current Science, 83(8):997-1000 (Oct. 25, 2002).
Stallings et al., "Imploding argon plasma experiments", Appl. Phys. Lett., 35(7), pp. 524-526 (Oct. 1, 1979).
Takahashi et al., "KrF laser picosecond pulse source by stimulated scattering processes", Opt. Commun. 215, 163-167 (2003).
Takahashi et al., "High-intensity short KrF laser-pulse generation by saturated amplification of truncated leading-edge pulse", Opt. Commun. 185. 185, 431-437 (2000).
Takenaka et al., "Heat resistance of Mo/Si, $MoSi_2$/Si, and $Mo_5Si_3$/Si multiplayer soft x-ray mirrors", J. Appl. Phys. 78(9) 5227-5230 (Nov. 1, 1995).
Tillack et al., "Magnetic Confinement of an expanding laser-produced plasma", UC San Diego, Center for Energy Research, UCSD Report & Abramova—Tornado Trap.
Wilhein et al., "A slit grating spectrograph for quantitative soft x-ray spectroscopy", Am. Inst. Of Phys. Rev. of Sci Instrum., 70(3):1694-1699, (Mar. 1999).
Wu et al., "The vacuum spark and spherical pinch x-ray/EUV point sources", SPIE, Conf. On Emerging Tech. III, Santa Clara, CA vol. 3676:410-420, (Mar. 1999).
Zombeck, "Astrophysical observations with high resolution x-ray telescope", Am. Inst. Of Phys., pp. 200-209, (1981).

* cited by examiner

LPP EUV LIGHT SOURCE DRIVE LASER SYSTEM

RELATED APPLICATIONS

The present application is a Continuation-in-Part of patent application Ser. No. 11/174,299, filed on Jun. 29, 2005, which is related to U.S. patent application Ser. No. 11/021,261, filed on Dec. 22, 2004, entitled EUV LIGHT SOURCE OPTICAL ELEMENTS, Ser. No. 11/067,124, entitled METHOD AND APPARATUS FOR EUV PLASMA SOURCE TARGET DELIVERY, filed on Feb. 25, 2005, and Ser. No. 10/979,945, entitled EUV COLLECTOR DEBRIS MANAGEMENT, filed on Nov. 1, 2004, and Ser. No. 10/979,919, entitled EUV LIGHT SOURCE, filed on Nov. 1, 2004, and Ser. No. 10/803,526, entitled A HIGH REPETITION RATE LASER PRODUCED PLASMA EUV LIGHT SOURCE, filed on Mar. 17, 2004, Ser. No. 10/900,839, entitled EUV LIGHT SOURCE, filed on Jul. 27, 2004, and Ser. No. 11/067,099, entitled SYSTEMS FOR PROTECTING INTERNAL COMPONENTS OF AN EUV LIGHT SOURCE FROM PLASMA-GENERATED DEBRIS, filed on Feb. 25, 2005, and 60/657,606, entitled EUV LPP DRIVE LASER, filed on Feb. 28, 2005, and the disclosures of all of which are hereby incorporated by reference.

FIELD OF THE INVENTION

The present invention related to laser produced plasma ("LPP") extreme ultraviolet ("EUV") light sources.

BACKGROUND OF THE INVENTION

CO2 laser may be used for laser produced plasma ("LPP") extreme ultraviolet ("EUV"), i.e., below about 50 nm and more specifically, e.g., at around 13.5 nm. Such systems may employ a drive laser(s) to irradiate a plasma formation material target, e.g., target droplets formed of a liquid containing target material, e.g., molten metal target material, such as lithium or tin.

$CO_2$ has been proposed as a good drive laser system, e.g., for tin because of a relatively high conversion efficiency both in terms of efficiency in converting laser light pulse photon energy into EUV photons and in terms of conversion of electrical energy used to produce the drive laser pulses for irradiating a target to form a plasma in which EUV light is generated and the ultimate wattage of EUV light generated.

Applicants propose an arrangement for delivering the drive laser pulses to the target irradiation site which addresses certain problems associated with certain types of drive lasers, e.g., $CO_2$ drive lasers.

Pre-pulses from the same laser as the main pulse (e.g., at a different wavelength than the main pulse may be used, e.g., with a YAG laser (355 nm—main and 532 nm—pre-pulse, for example). Pre-pulses from separate lasers for the pre-pulse and main pulse may also be used. Applicants propose certain improvements for providing a pre-pulse and main pulse, particularly useful in certain types of drive laser systems, such as $CO_2$ drive laser systems.

Applicants also propose certain improvements to certain types of drive lasers to facilitate operation at higher repetition rates, e.g., at 18 or more kHz.

SUMMARY OF THE INVENTION

An apparatus and method is disclosed which may comprise a laser produced plasma EUV system which may comprise a drive laser producing a drive laser beam; a drive laser beam first path having a first axis; a drive laser redirecting mechanism transferring the drive laser beam from the first path to a second path, the second path having a second axis; an EUV collector optical element having a centrally located aperture; and a focusing mirror in the second path and positioned within the aperture and focusing the drive laser beam onto a plasma initiation site located along the second axis. The apparatus and method may comprise the drive laser beam is produced by a drive laser having a wavelength such that focusing on an EUV target droplet of less than about 100 μm at an effective plasma producing energy if not practical in the constraints of the geometries involved utilizing a focusing lens. The drive laser may comprise a $CO_2$ laser. The drive laser redirecting mechanism may comprise a mirror. The focusing mirror may be positioned and sized to not block EUV light generated in a plasma produced at the plasma initiation site from the collector optical element outside of the aperture. The redirecting mechanism may be rotated and the focusing mirror may be heated. The apparatus and method may further comprise a seed laser system generating a combined output pulse having a pre-pulse portion and a main pulse portion; and an amplifying laser amplifying the pre-pulse portion and the main pulse portion at the same time without the pre-pulse portion saturating the gain of the amplifier laser. The amplifying laser may comprise a $CO_2$ laser. The pre-pulse portion of the combined pulse may be produced in a first seed laser and the main pulse portion of the combined pulse may be produced in s second seed laser or the pre-pulse and main pulse portions of the combined pulse being produced in a single seed laser. The apparatus and method may further comprise a seed laser producing seed laser pulses at a pulse repetition rate X of at least 4 kHz, e.g., 4, 6, 8, 12 or 18 kHz; and a plurality of N amplifier lasers each being fired at a rate of X/N, positioned in series in an optical path of the seed laser pulses and each amplifying in a staggered timing fashion a respective Nth seed pulse are a pulse repetition rate of X/N. Each respective amplifier laser may be fired in time with the firing of the seed producing laser such that the respective Nth output of the seed producing laser is within the respective amplifier laser. The seed laser pulse may comprise a pre-pulse portion and a main pulse portion.

DETAILED DESCRIPTION OF PREFERRED EMBODIMENTS

Figure 1:
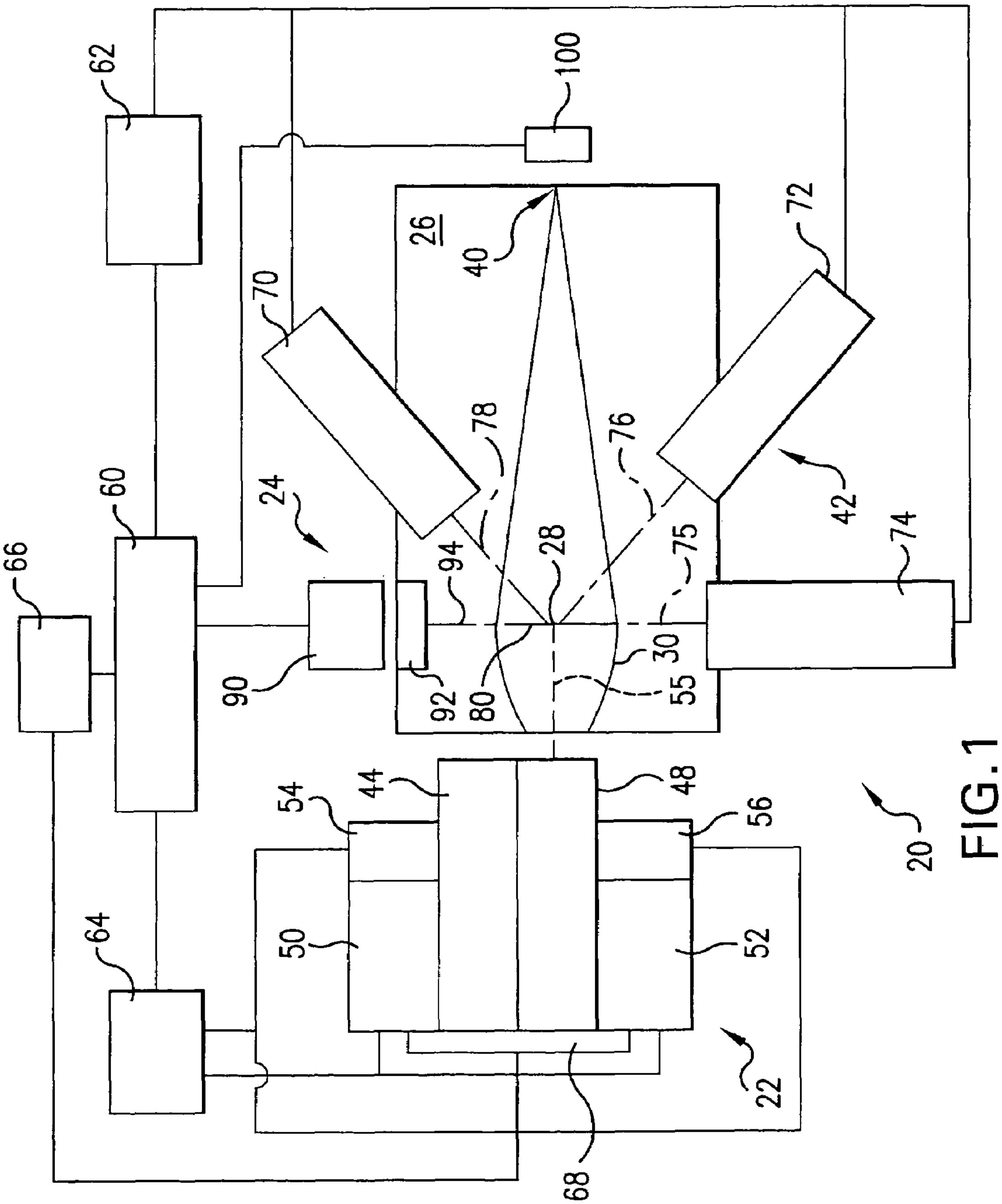
FIG. 1 shows a schematic block diagram illustration of a DPP EUV light source system in which aspects of embodiments of the present invention are useful.

Turning now to FIG. 1 there is shown a schematic view of an overall broad conception for an EUV light source, e.g., a laser produced plasma EUV light source 20 according to an aspect of the present invention. The light source 20 may contain a pulsed laser system 22, e.g., a gas discharge laser, e.g., an excimer gas discharge laser, e.g., a KrF or ArF laser or a $CO_2$ laser operating at high power and high pulse repetition rate and may be a MOPA configured laser system, e.g., as shown in U.S. Pat. Nos. 6,625,191, 6,549,551, and 6,567,450. The laser may also be, e.g., a solid state laser, e.g., a YAG laser. The light source 20 may also include a target delivery system 24, e.g., delivering targets in the form of liquid droplets, solid particles or solid particles contained within liquid droplets. The targets may be delivered by the target delivery system 24, e.g., into the interior of a chamber 26 to an irradiation site 28, otherwise known as an ignition site or the sight of the fire ball. Embodiments of the target delivery system 24 are described in more detail below.

Laser pulses delivered from the pulsed laser system 22 along a laser optical axis 55 through a window (not shown) in the chamber 26 to the irradiation site, suitably focused, as discussed in more detail below in coordination with the arrival of a target produced by the target delivery system 24 to create an ignition or fire ball that forms an x-ray (or soft x-ray (EUV) releasing plasma, having certain characteristics, including wavelength of the x-ray light produced, type and amount of debris released from the plasma during or after ignition, according to the material of the target.

The light source may also include a collector 30, e.g., a reflector, e.g., in the form of a truncated ellipse, with an aperture for the laser light to enter to the ignition site 28. Embodiments of the collector system are described in more detail below. The collector 30 may be, e.g., an elliptical mirror that has a first focus at the ignition site 28 and a second focus at the so-called intermediate point 40 (also called the intermediate focus 40) where the EUV light is output from the light source and input to, e.g., an integrated circuit lithography tool (not shown). The system 20 may also include a target position detection system 42. The pulsed system 22 may include, e.g., a master oscillator-power amplifier ("MOPA") configured dual chambered gas discharge laser system having, e.g., an oscillator laser system 44 and an amplifier laser system 48, with, e.g., a magnetic reactor-switched pulse compression and timing circuit 50 for the oscillator laser system 44 and a magnetic reactor-switched pulse compression and timing circuit 52 for the amplifier laser system 48, along with a pulse power timing monitoring system 54 for the oscillator laser system 44 and a pulse power timing monitoring system 56 for the amplifier laser system 48. The pulse power system may include power for creating laser output from, e.g., a YAG laser. The system 20 may also include an EUV light source controller system 60, which may also include, e.g., a target position detection feedback system 62 and a firing control system 65, along with, e.g., a laser beam positioning system 66. The system could also incorporate several amplifiers in cooperation with a single master oscillator.

The target position detection system may include a plurality of droplet imagers 70, 72 and 74 that provide input relative to the position of a target droplet, e.g., relative to the ignition site and provide these inputs to the target position detection feedback system, which can, e.g., compute a target position and trajectory, from which a target error can be computed, if not on a droplet by droplet basis then on average, which is then provided as an input to the system controller 60, which can, e.g., provide a laser position and direction correction signal, e.g., to the laser beam positioning system 66 that the laser beam positioning system can use, e.g., to control the position and direction of the laser position and direction changer 68, e.g., to change the focus point of the laser beam to a different ignition point 28.

The imager 72 may, e.g., be aimed along an imaging line 75, e.g., aligned with a desired trajectory path of a target droplet 94 from the target delivery mechanism 92 to the desired ignition site 28 and the imagers 74 and 76 may, e.g., be aimed along intersecting imaging lines 76 and 78 that intersect, e.g., alone the desired trajectory path at some point 80 along the path before the desired ignition site 28.

The target delivery control system 90, in response to a signal from the system controller 60 may, e.g., modify the release point of the target droplets 94 as released by the target delivery mechanism 92 to correct for errors in the target droplets arriving at the desired ignition site 28.

An EUV light source detector 100 at or near the intermediate focus 40 may also provide feedback to the system controller 60 that can be, e.g., indicative of the errors in such things as the timing and focus of the laser pulses to properly intercept the target droplets in the right place and time for effective and efficient LPP EUV light production.

Figure 2:
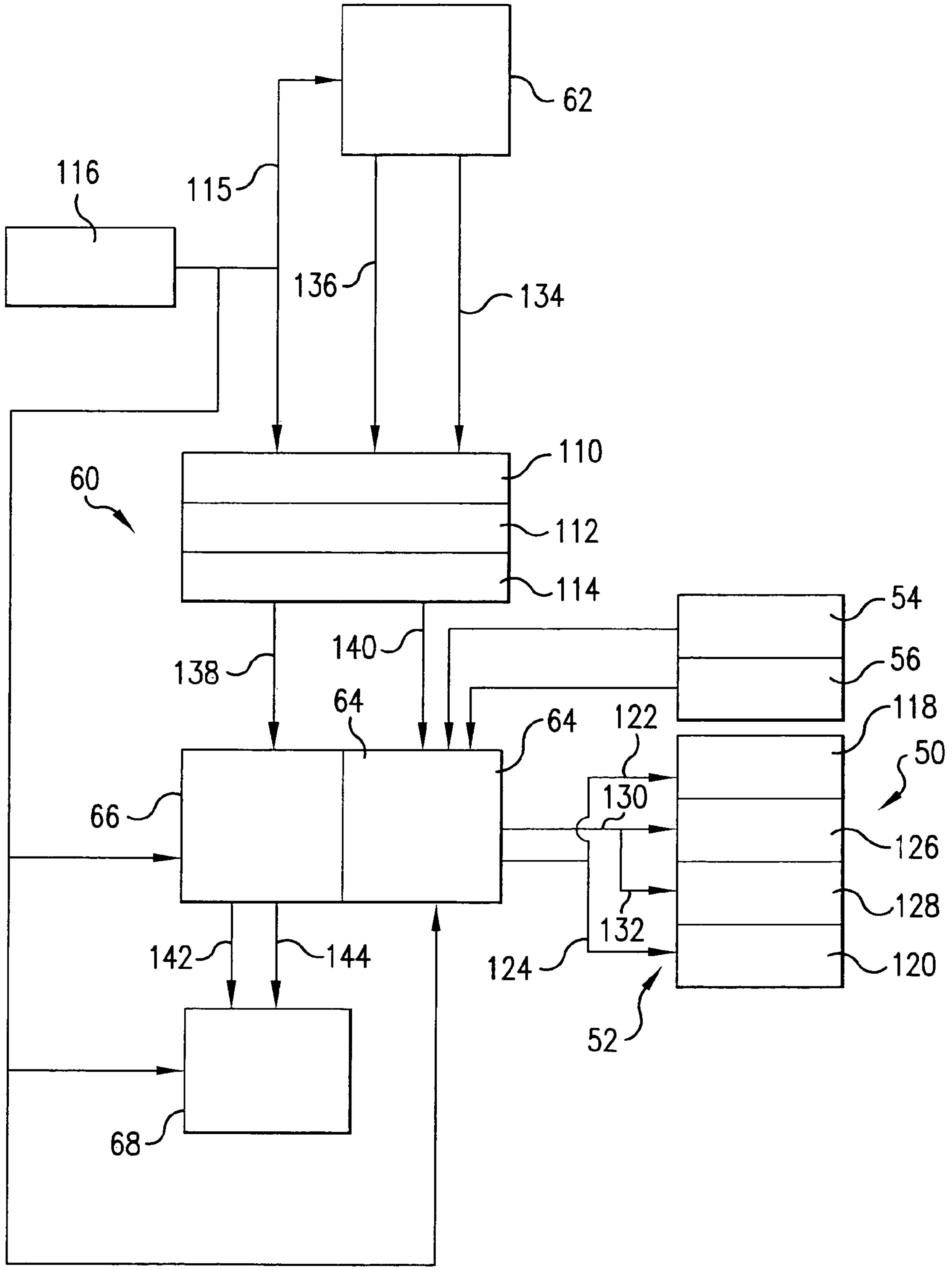
FIG. 2 shows a schematic block diagram illustration of a control system for the light source of FIG. 1 useful with aspects of embodiments of the present invention.

Turning now to FIG. 2 there is shown schematically further details of a controller system 60 and the associated monitoring and control systems, 62, 64 and 66 as shown in FIG. 1. The controller may receive, e.g., a plurality of position signal 134, 136 a trajectory signal 136 from the target position detection feedback system, e.g., correlated to a system clock signal provided by a system clock 116 to the system components over a clock bus 115. The controller 60 may have a pre-arrival tracking and timing system 110 which can, e.g., compute the actual position of the target at some point in system time and a target trajectory computation system 112, which can, e.g., compute the actual trajectory of a target drop at some system time, and an irradiation site temporal and spatial error computation system 114, that can, e.g., compute a temporal and a spatial error signal compared to some desired point in space and time for ignition to occur.

The controller 60 may then, e.g., provide the temporal error signal 140 to the firing control system 64 and the spatial error signal 138 to the laser beam positioning system 66. The firing control system may compute and provide to a resonance charger portion 118 of the oscillator laser 44 magnetic reactor-switched pulse compression and timing circuit 50 a resonant charger initiation signal 122 and may provide, e.g., to a resonance charger portion 120 of the PA magnetic reactor-switched pulse compression and timing circuit 52 a resonant charger initiation signal, which may both be the same signal, and may provide to a compression circuit portion 126 of the oscillator laser 44 magnetic reactor-switched pulse compression and timing circuit 50 a trigger signal 130 and to a compression circuit portion 128 of the amplifier laser system 48 magnetic reactor-switched pulse compression and timing circuit 52 a trigger signal 132, which may not be the same signal and may be computed in part from the temporal error signal 140 and from inputs from the light out detection apparatus 54 and 56, respectively for the oscillator laser system and the amplifier laser system. The Pa could also possibly be a CW or $CO_2$ laser.

The spatial error signal may be provided to the laser beam position and direction control system 66, which may provide, e.g., a firing point signal and a line of sight signal to the laser beam positioner which may, e.g., position the laser to change the focus point for the ignition site 28 by changing either or both of the position of the output of the laser system amplifier laser 48 at time of fire and the aiming direction of the laser output beam.

In order to improve the total conversion efficiency ("TCE"), including the drive laser conversion efficiency ("DLCE") relating to the conversion of drive laser light pulse energy into EUV photon energy and also the electrical conversion efficiency ("ECE") in converting electrical energy producing the drive laser pulses to EUV light energy, and also to reduce the drive laser overall costs, as well as EUV system costs, according to aspects of an embodiment of the present invention, applicants propose to provide for the generation of both a drive laser pre-pulse and a drive laser main pulse from the same $CO_2$ laser. This can also have a positive impact on laser light focusing optics lifetimes and drive laser light input window lifetime.

Applicants have recently determined through much investigation, experimentation and analysis that the use of a $CO_2$ drive laser for LPP EUV can have certain very beneficial results, e.g., in the case of a Sn-based EUV LPP plasma source material. By way of example a relatively high DLCE and ECE and thus also TCE number can be reached for conversion of electrical energy and also drive laser light energy into EUV. However, drive lasers such as $CO_2$ drive lasers suffer from a rather significant inability to properly focus such drive lasers as opposed to, e.g., solid state lasers like Nd:YAG lasers or excimer lasers such as XeF or XeCl lasers. The $CO_2$ laser output pulse light at 10.6 μm radiation is difficult to focus tightly at the required dimensions.

Figure 3:
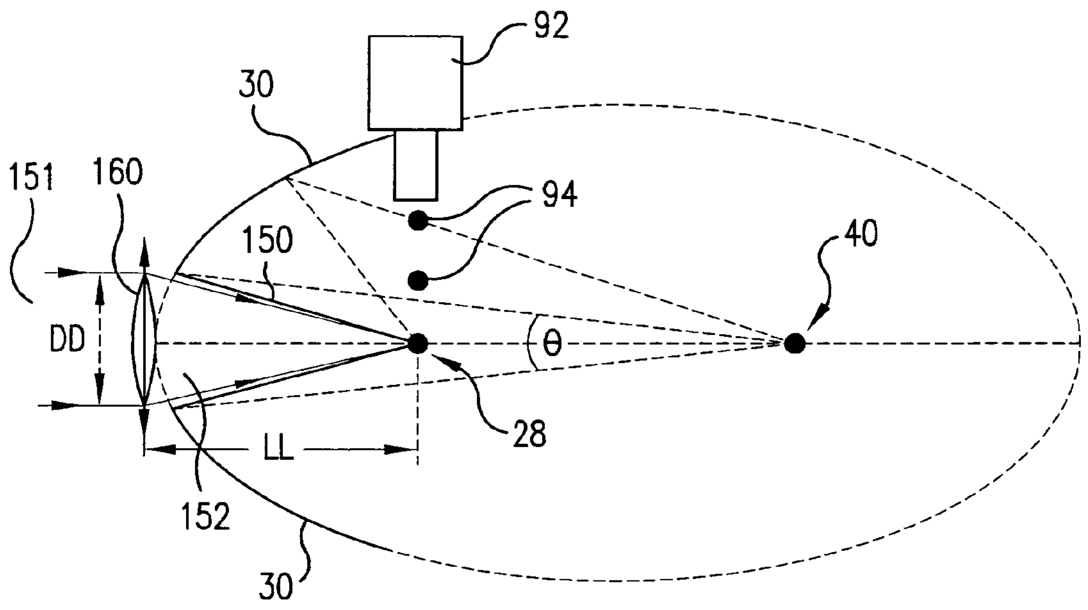
FIG. 3 shows schematically an example of a proposed drive laser delivery system utilizing a focusing lens.

A typical size of a plasma formation material target droplet 94 may be on the order of from 10-100 microns, depending on the material of the plasma source and also perhaps the drive laser type, with smaller generally being better, e.g., from a debris generation and consequent debris management point of view. With currently proposed focusing schemes, e.g., as illustrated schematically and not to scale in FIG. 3, e.g., utilizing a focusing lens 160 a drive laser beam 152 of diameter DD (e.g., about 50 mm) and focal distance LL (, e.g., about 50 cm, to focus 10.6 micron wavelength radiation into, e.g., even the largest end of the droplet range, e.g., at about 100 microns, the divergence of a laser should be less than $2*10^{-4}$ radian. This value is less than diffraction limit of $1.22*10.6*10^{-6}/50*10^{-3}=2.6*10^{-4}$ (e.g., for an aperture of 50 mm). Therefore, the focus required cannot be reached, and, e.g., laser light energy will not enter the target droplet and CE is reduced.

To overcome this limitation either focal distance has to be decreased or the lens 160 and laser beam 151 diameter has to be increased. This, however, can be counterproductive, since it would then require a large central opening in a EUV collector 30, reducing the EUV collection angle. The larger opening also results in limiting the effect of the debris mitigation offered by the drive laser delivery enclosure 150, as that is explained in more detail in one or more of the above referenced co-pending applications. This decrease in effectiveness, among other things can result in a decrease in the laser input window lifetime.

Figure 4:
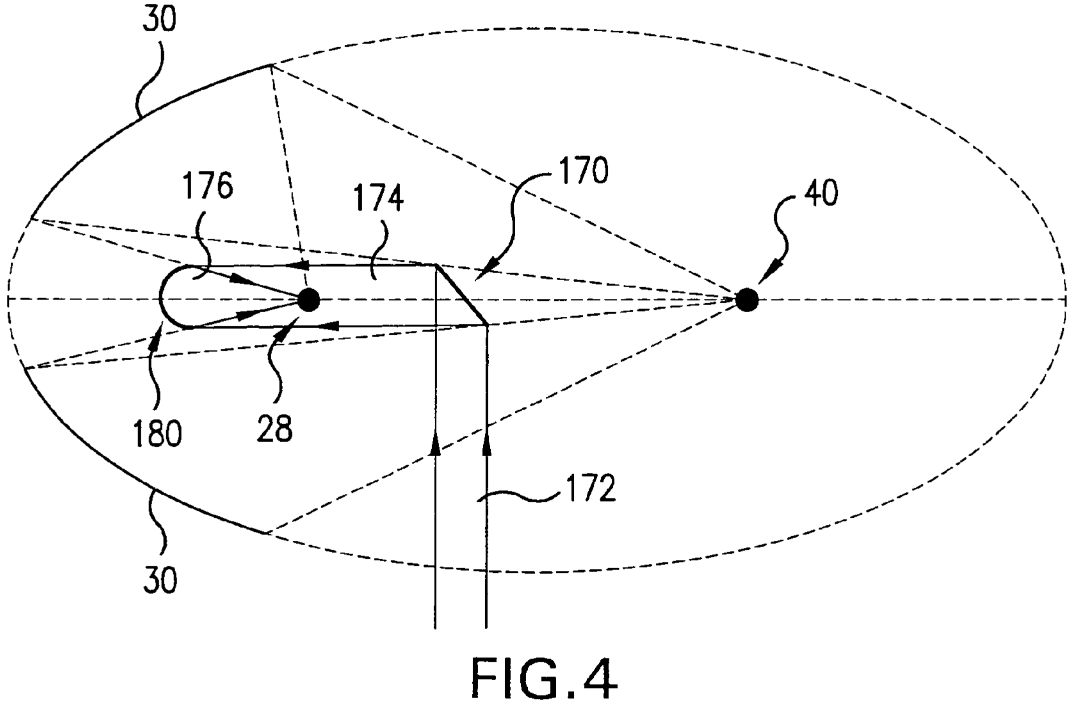
FIG. 4 illustrates schematically a drive laser delivery system according to aspects of an embodiment of the present invention.
Figure 5:
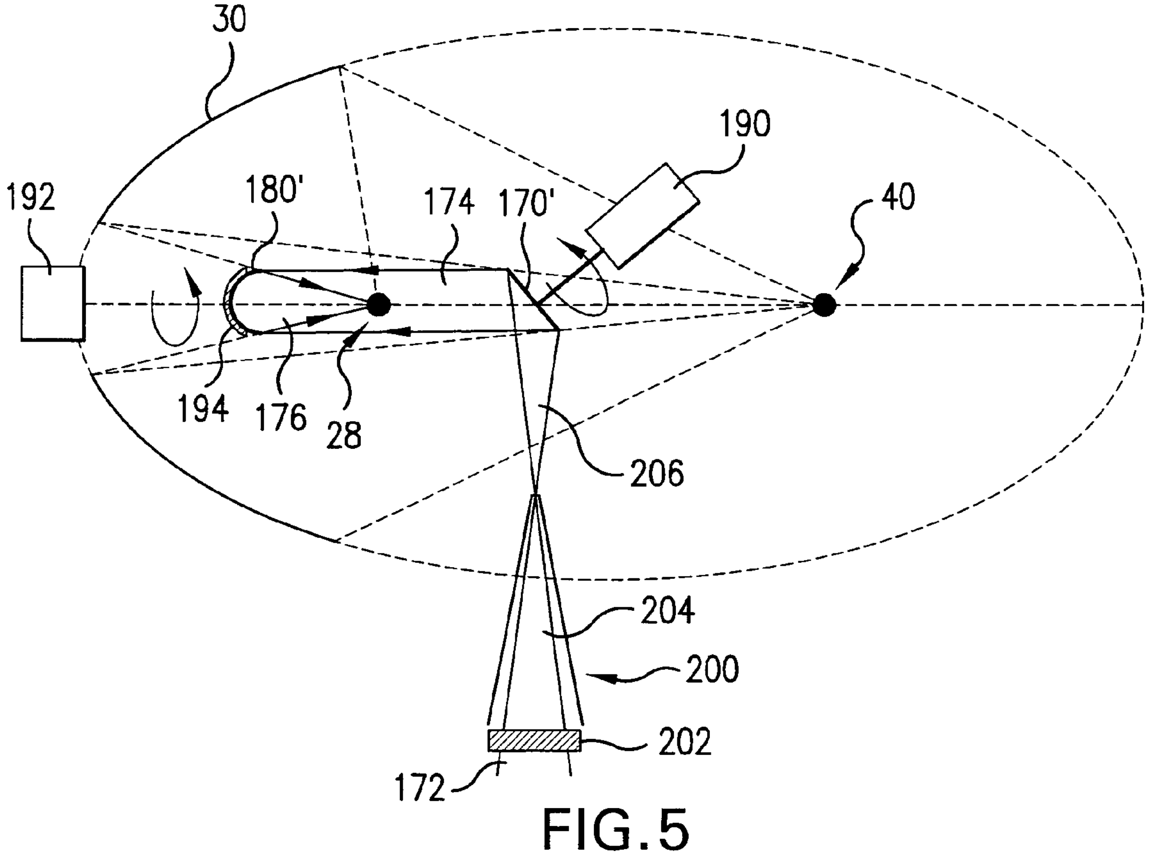
FIG. 5 shows schematically a drive laser delivery system according to aspects of an embodiment of the present invention.

According to aspects of an embodiment of the present invention applicants propose an improved method and apparatus for the input of drive laser radiation as illustrated schematically and not to scale in FIGS. 4 and 5. For, e.g., a CO2 laser it is proposed to use internal reflecting optics with high NA and also, e.g., using deposited plasma initiation source material, e.g., Sn as a reflecting surface(s). The focusing scheme may comprise, e.g., two reflecting mirrors 170, 180. Mirror 170 may, e.g., be a flat or curved mirror made, e.g., of molybdenum. The final focusing mirror 180 can, e.g., focuses $CO_2$ radiation in a $CO_2$ drive laser input beam 172, redirected by the redirecting mirror 170 into the focusing mirror 180 to form a focused beam 176 intersecting the target droplets 92 at the desired plasma initiation site 28.

The focal distance of mirror 180 may be significantly less than 50 cm, e.g., 5 cm but not limited by this number. Such a short focal distance mirror 180 can, e.g., allow for the focus of the $CO_2$ radiation on, e.g., 100 micron or less droplets, and particularly less than 50 μm and down to even about 10 μm.

Applicants also propose to use heating, e.g., with heaters 194, e.g., a Mo-ribbon heater, which can be placed behind the mirror 180' according to aspects of an embodiment illustrated schematically and not to scale in FIG. 5. Heating to above the Sn melting point and rotation, using, e.g., spinning motor 192 for the mirror 180', which may be a brushless low voltage motor, e.g., made by MCB, Inc. under the name LB462, and may be encased in a stainless steel casing to protect it from the environment of the plasma generation chamber 26, and a similar motor 190 for the mirror 170', can be employed. Reflection of the laser radiation will be, e.g., from a thin film of the plasma source material, e.g., Sn, coating the mirrors 170, 180, due to deposition from the LPP debris. Rotation can be used if necessary to create smooth surface of the molten plasma source material, e.g., Sn. This thin film of liquid Sn can form a self-healing reflective surface for the mirror 170, 180. Thus, plasma source material deposition, e.g., Sn deposition on the mirror 170, 180 can be utilized as a plus instead of a negative were the focusing optics in the form of one or more lenses. The requirements for roughness (lambda/10) for 10.6 μm radiation can be easily achieved. The mirrors 170, 180 can be steered and/or positioned with the motors 192, 192.

Reflectivity of the liquid Sn can be estimated from Drude's formula which gives a good agreement with experimental results for the wavelengths exceeding 5 μm.

$R \approx 1-2/\sqrt{(S*T)}$, where S is the conductivity of the metal (in CGS system) and T is the oscillation period for the radiation. For copper the formula gives estimation of reflectivity for 10.6 μm about 98.5%. For Sn the reflectivity estimate is 96%.

Heating of, e.g., the mirror 180' of FIG. 5 above required melting point may also be performed with an external heater (not shown) installed behind the rotating mirror 180' with a radiative heat transfer mechanism or by self-heating due to, e.g., about 4% radiation absorption from the drive laser light and/or proximity to the plasma generation site 28.

As shown schematically in FIGS. 4 and 5, the laser radiation 172 may be delivered into the chamber through a side port and therefore not require an overly large aperture in the central portion of the collector 30. For example with approximately the same size central aperture as is effective for certain wavelengths, e.g., in the excimer laser DUV ranges, but ineffective for a focusing lens for wavelengths such as $CO_2$, the focusing mirror arrangement according to aspects of an embodiment of the present invention can be utilized. In addition the laser input window 202, which may be utilized for vacuum sealing the chamber 26 and laser delivery enclosure 300 are not in direct line of view of plasma initiation site and debris generation area, as is the case with the delivery system of FIG. 3. Therefore, the laser delivery enclosure with its associated apertures and purge gas and counter flow gas, as described in more detail in at least one of the above noted co-pending applications, can be even more effective in preventing debris from reaching the window 202. Therefore, even if the focusing of the LPP drive laser light as illustrated according to aspects of the embodiment of FIG. 5, e.g., at the distal end of the drive laser delivery enclosure 200, needs to be relatively larger, e.g., for a $CO_2$ drive laser, the indirect angle of the debris flight path from the irradiation site 28 to the distal end of the enclosure 200 allows for larger or no apertures at the distal end, whereas the enlargement or removal of the apertures at the distal end of the enclosure 150 illustrated in the embodiment of FIG. 3 could significantly impact the ability of the enclosure 150 to keep debris from, e.g., the lens 160 (which could also in some embodiments serve as the chamber window or be substituted for by a chamber window). Thus, where debris management is a critical factor, the arrangement of FIGS. 4 and 5 may be utilized to keep the drive laser input enclosure off of the optical axis of the focused LPP drive laser beam 152, 176 to the irradiation site 28.

According to aspects of an embodiment of the present invention, for example, the laser beam 172 may be focused by external lens and form a converging beam 204 with the open orifice of the drive laser input enclosure cone 200 located close to the focal point. For direct focusing scheme when external lens, e.g., lens 160 of FIG. 3, focuses the beam on the droplets 94 the cone tip would have to be located at some relatively distance, e.g., 20-50 mm from the focal point, i.e., the plasma initiation site 28, for intersection with the droplet target 94 at about the focal point of the lens 160. This can subject the distal end to a significant thermal load, with essentially all of the drive laser power being absorbed by the target in the formation of the plasma and being released in or about the plasma. For the suggested optical arrangement according to aspects of an embodiment of the present invention with intermediate focus the cone tip can be approached to the focal point (at distance of few millimeters) and output orifice of the cone can be very small. This allows us to increase significantly the gas pressure in the gas cone and reduce significantly the pressure in the chamber with other parameters (window protection efficiency, pumping speed of the chamber) keeping the same. Reflecting optics may be utilized, e.g., for a $CO_2$ laser.

Figure 6:
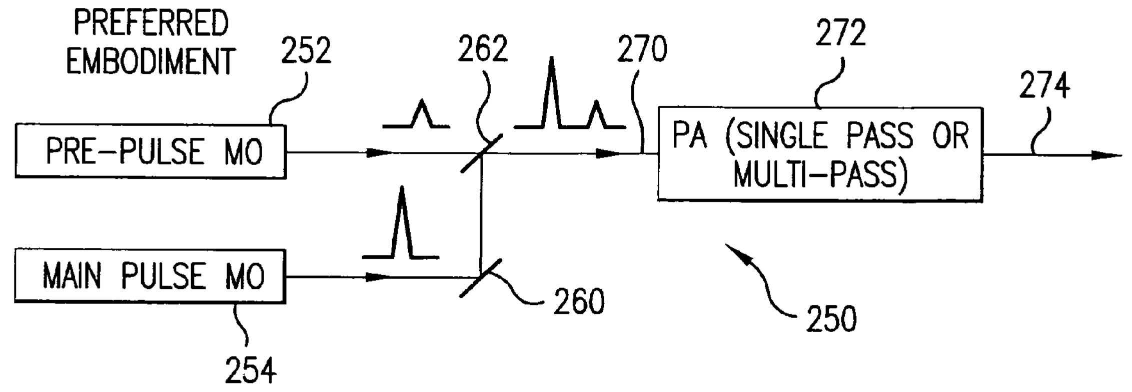
FIG. 6 shows schematically in block diagram form an LPP EUV drive laser system according to aspects of an embodiment of the present invention.

Referring now to FIG. 6, there is shown schematically and in block diagram form a drive laser system 250, e.g., a $CO_2$ drive laser, according to aspects of an embodiment of the present invention, which may comprise a pre-pulse master oscillator ("MO") 252 and a main pulse master oscillator ("MO") 254, each of which may be a $CO_2$ gas discharge laser or other suitable seed laser, providing seed laser pulses at about 10.6 μm in wavelength to a power amplifier ("PA") 272, which may be a single or multiple pass $CO_2$ gas discharge laser, lasing at about 10.6 μm. The output of the MO 252 may form a pre-pulse, having a pulse energy of about 1% to 10% of the pulse energy of the main pulse, and the output of the MO 254 may form a main pulse having a pulse energy of about $1\times10^{10}$ watts/cm$^2$, with wavelengths that may be the same or different.

The output pulse from the MO 255 may be reflected, e.g., by a mirror 260, to a polarizing beam splitter 262, which will also reflect all or essentially all of the light of a first selected polarity into the PA 272 as a seed pulse to be amplified in the PA 272. The output of the MO 252 of a second selected polarity can be passed through the polarizing beam splitter 262 and into the PA 272 as another seed pulse. The outputs of the MO 252 and MO 254 may thus be formed into a combined seed pulse 270 having a pre-pulse portion from the MO 252 and a main pulse portion from the MO 254.

The combined pulse 270 may be amplified in the PA 272 as is known in the art of MOPA gas discharge lasers, with pulse power supply modules as are sold by Applicants' Assignee, e.g., as XLA 100 and XLA 200 series MOPA laser systems with the appropriate timing between gas discharges in the MO's 252, 254 and PA 272 to insure the existence of an amplifying lasing medium in the PA as the combined pulse 270 is amplified to form a drive laser output pulse 274. The timing of the firing of the MO 254 and the MO 252, e.g., such that the MO 254 is filed later in time such that its gas discharge is, e.g., initiated after the firing of the MO 252, but also within about a few nanoseconds of the firing of the MO 252, such that the pre-pulse will slightly precede the main pulse in the combined pulse 270. It will also be understood by those skilled in the art that the nature of the pre-pulse and main pulse, e.g., the relative intensities, separation of peaks, absolute intensities, etc. will be determined from the desired effect(s) in generating the plasma and will relate to certain factors, e.g., the type of drive laser and, e.g., its wavelength, the type of target material, and e.g., its target droplet size and so forth.

Figure 7:
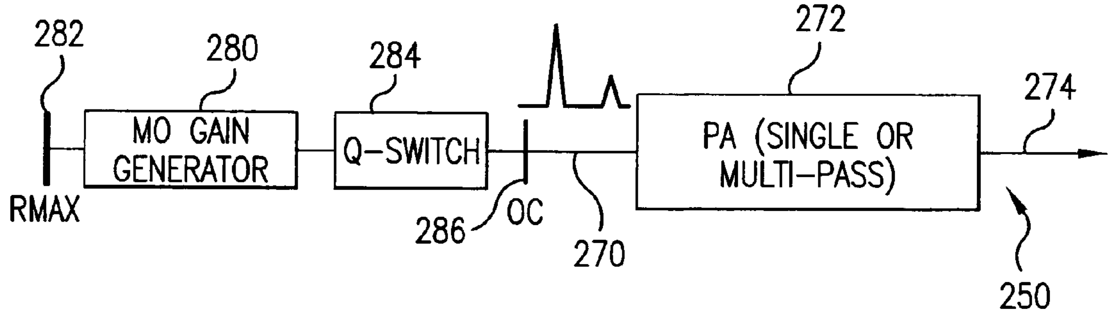
FIG. 7 shows schematically in block diagram form an LPP EUV drive laser system according to aspects of an embodiment of the present invention.

Turning now to FIG. 7 there is shown in schematic block diagram form aspects of an embodiment of the present invention which may comprise a drive laser system 250, e.g., a $CO_2$ drive laser system, e.g., including an MO gain generator 280, formed, e.g., by a laser oscillator cavity having a cavity rear mirror 282 and an output coupler 286, with a Q-switch 284 intermediate the two in the cavity useful for generating within the cavity, first a pre-pulse and then a main pulse, to form a combined pulse 270 for amplification in a PA 272 as described above in reference to FIG. 6.

Figure 8:
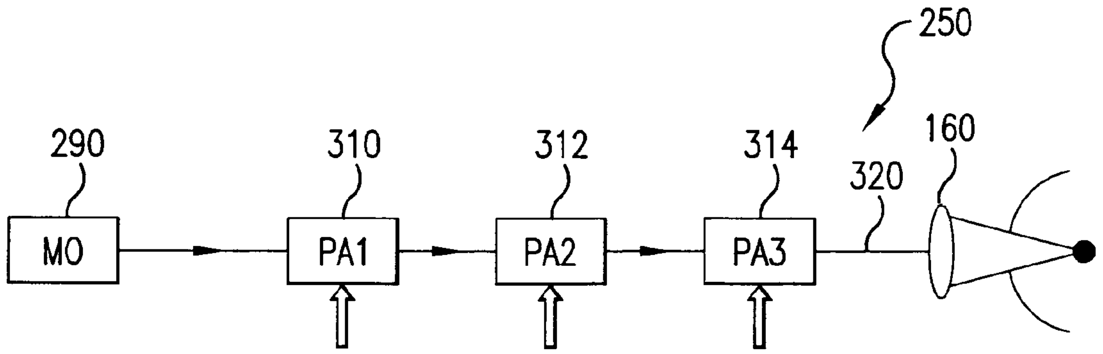
FIG. 8 shows schematically in block diagram form an LPP EUV drive laser system according to aspects of an embodiment of the present invention.

Turning now to FIG. 8 there is shown a multiple power amplifier high repetition rate drive laser system 300, such as a $CO_2$ drive laser system, capable of operation at output pulse repetition rates of on the order of 18 kHz and even above. The system 250 of FIG. 8 may comprise, e.g., a master oscillator 290, and a plurality, e.g., of three PA, 310, 312 and 314 in series. Each of the PA's 310, 312, and 314 may be provided with gas discharge electrical energy from a respective pulse power system 322, 324, 326, each of which may be charged initially by a single high voltage power supply (or by separate respective high voltage power supplies) as will be understood by those skilled in the art.

Figure 9:
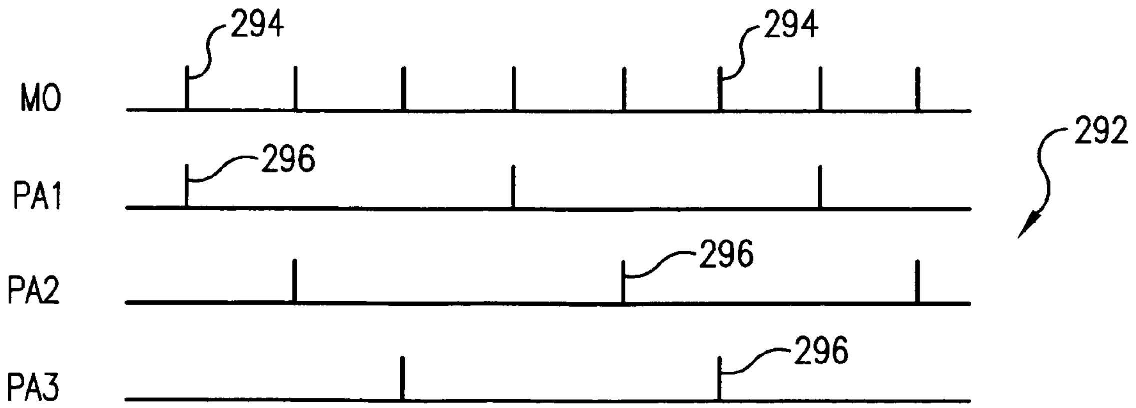
FIG. 9 shows a drive laser firing diagram according to aspects of an embodiment of the present invention.

Referring to FIG. 9 there is shown a firing diagram 292 which can result in an output pulse repetition rate of X times the number of PA, e.g., x*3 in the illustrative example of FIG. 8, i.e., 18 kHZ for three Pas each operating at 6 kHz. That is, the MO generates relatively low energy seed pulses at a rate indicated by the MO output pulse firing timing marks 294, while the firing of the respective PA's can be staggered as indicated by the firing timing marks 296, such that the MO output pulses are successively amplified in successive ones of the PAs 310, 312, 314 as illustrated by the timing diagram. It will also be understood by those skilled in the art that the timing between the respective firings of the MO 290 and each respective PA 310, 312, 314 will need to be adjusted to allow the respective output pulse from the MO to reach the position in the overall optical path where amplification can be caused to occur in the respective PA 310, 312, 314 by, e.g., a gas discharge between electrodes in such respective PA 310, 312, 314, for amplification to occur in the respective PA 310, 312, 314.

Figure 10:
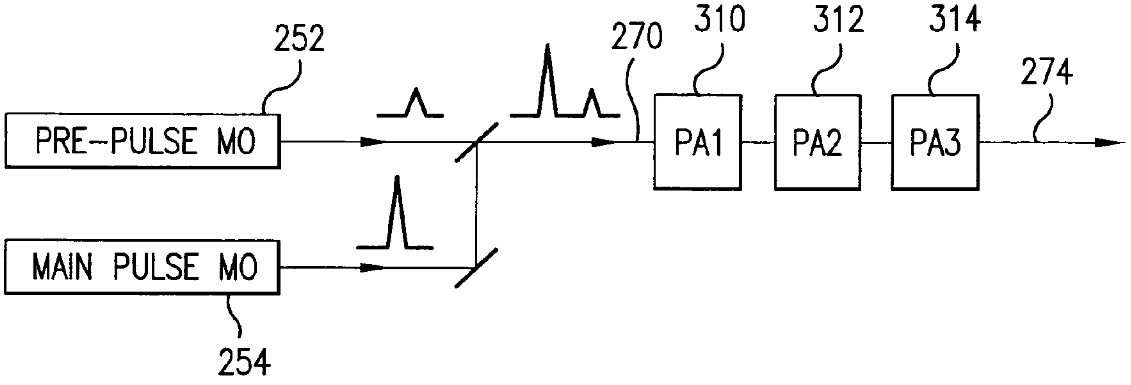
FIG. 10 shows schematically in block diagram form an LPP EUV drive laser system according to aspects of an embodiment of the present invention.
Figure 11:
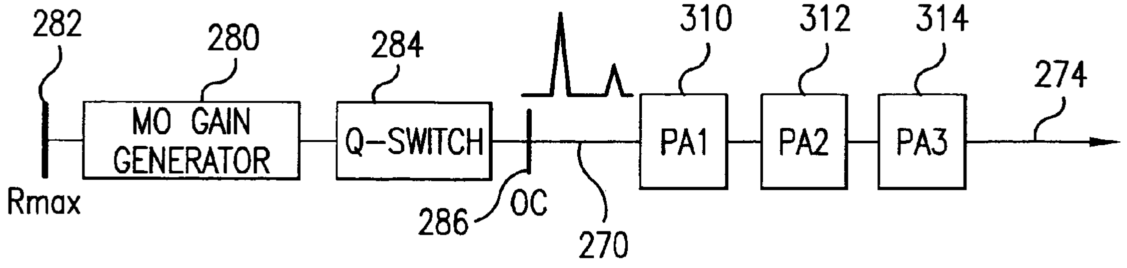
FIG. 11 shows schematically in block diagram form an LPP EUV drive laser system according to aspects of an embodiment of the present invention.

Turning now to FIGS. 10 and 11 drive laser systems, e.g., $CO_2$ drive laser systems combining the features of the embodiments of FIGS. 6 and 7 can be utilized according to aspects of an embodiment of the present invention to create higher repetition rate output laser pulses 274 with a combined pre-pulse and main pulse, by, e.g., generating the combined pulses 270 as discussed above and amplifying each of these in a selected PA 310, 312, 314 on a stagger basis as also discussed above.

It will be understood by those skilled in the art that the systems 250 described above may comprise a $CO_2$ LPP drive laser that has two MO's (pre-pulse and main pulse) and a single PA (single pass or multi-pass), with the beam from both MO's being combined into a single beam, which is amplified by a PA, or a combined beam formed by Q-switching within a resonance cavity, and that the so produced combined pre-pulse and main pulse beam may then be amplified in a single PA, e.g., running at the same pulse repetition rate as the MO(s) producing the combined pulse or by a series of PAs operating at a pulse repetition rate i/x times the pulse repetition rate of the combined pulse producing MO(s) where x is the number of PAs and the PAs are fired sequentially in a staggered fashion. Combining of two beams from the respective MOs can be done either by polarization or by using a beam splitter and take the loss in one of the MO paths, e.g., in the pre-pulse MO path. It will also be understood that, e.g., because of low gain of, e.g., a $CO_2$ laser, the same PA can be shared for amplifying both pre-pulse and main pulse contained in the combined pulse at the same time. This is unique for certain types of lasers, e.g., $CO_2$ lasers and would not possible for others, e.g., excimer lasers due to their much larger gains and/or easier saturation.

Figure 12:
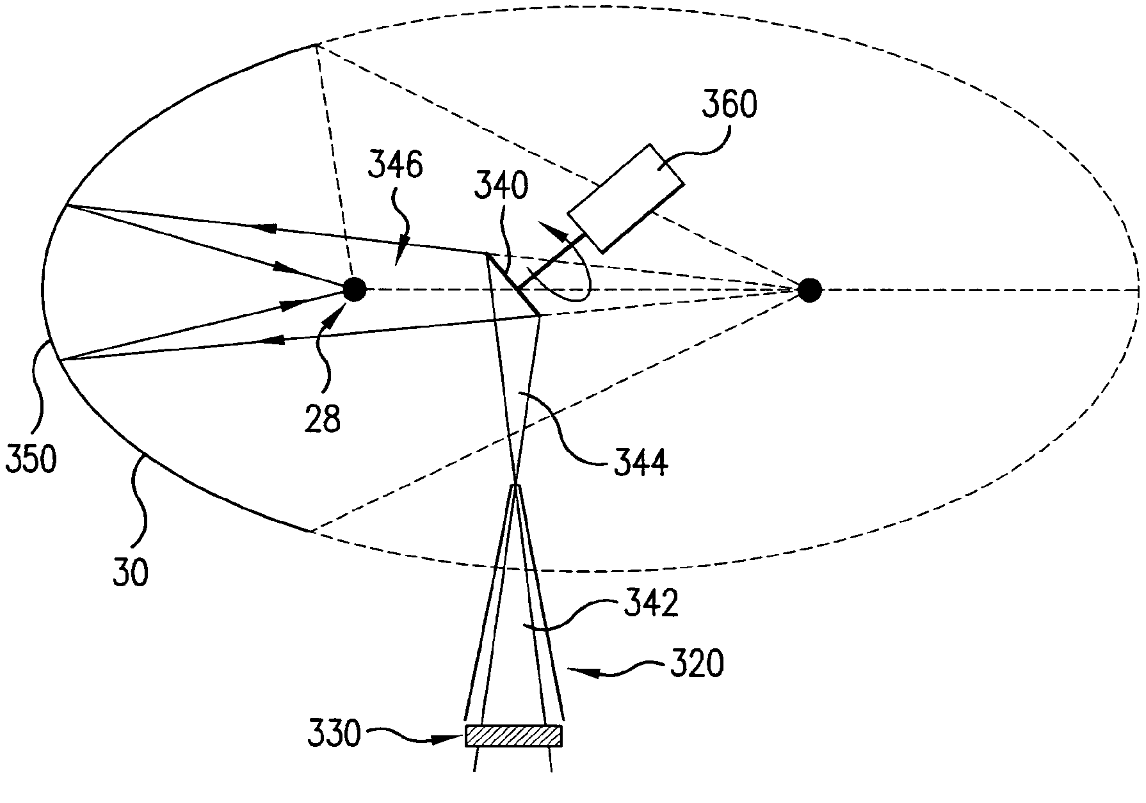
FIG. 12 shows a schematically an illustration of aspects of a further embodiment of the present invention.

Turning now to FIG. 12 there is shown schematically an illustration of aspects of a further embodiment of the present invention. This embodiment may have a drive laser delivery enclosure 320 through which can pass a focused drive laser beam 342 entering through a drive laser input window 330. The drive laser beam 342 may form an expanding beam 344 after being focused and then be steered by, e.g., a flat steering mirror 340, with the size of the beam 344 and mirror 340 and the focal point for the focused drive laser beam 342 being such that the steered beam 346 irradiates a central portion 350 of the collector 30 such that the beam 346 is refocused to the focal point 28 of the collector for irradiation of a target droplet to form an EUV producing plasma. The mirror 340 may be spun by a spinning motor 360 as described above. The central portion 350 of the collector 30 may be formed of a material that is reflective in the DUV range of the drive laser, e.g., $CaF_2$ with a suitable reflectivity coating for 351 nm for a XeF laser or a material reflective at around 10 μm wavelength for a $CO_2$ laser.

Those skilled in the art will appreciate that the above Specification describes an apparatus and method which may comprise a laser produced plasma EUV system which may comprise a drive laser producing a drive laser beam; a drive laser beam first path having a first axis; a drive laser redirecting mechanism transferring the drive laser beam from the first path to a second path, the second path having a second axis; an EUV collector optical element having a centrally located aperture, i.e., an opening, where, e.g., other optical elements not necessarily associated with the collector optical element may be placed, with the opening s sufficiently large, e.g., several sterradians, collector optic to effectively collect EUV light generated in a plasma when irradiated with the drive laser light. The apparatus and method may further comprise a focusing mirror in the second path and positioned within the aperture and focusing the drive laser beam onto the plasma initiation site located along the second axis. It will also be understood, as explained in ore detail in one or more of the above referenced co-pending applications, that the plasma initiation may be considered to be an ideal site, e.g., precisely at a focus for an EUV collecting optic. However, due to a number of factors, from time to time and perhaps most of the time the actual plasma initiation site may have drifted from the ideal plasma initiation site and control systems may be utilized to direct the drive laser beam and/or the target delivery system to move the laser/target intersection and actual plasma initiation site back to the ideal site. Thus concept of a plasma initiation site as used herein, including in the appended claims, incorporates this concept of the desired or ideal plasma initiation site remaining relatively fixed (it could also change over a relatively slow time scale, as compared, e.g., to pulse repetition rated in the many kHz), but due to operational and/or control system drift and the like the actual plasma initiation sites may be many sited varying in time as the control system brings the plasma initiation site from an erroneous position, still generally in the vicinity of the ideal or desired site for optimized collection, to the desired/ideal position, e.g., at the focus.

The apparatus and method may comprise the drive laser beam being produced by a drive laser having a wavelength such that focusing on an EUV target droplet of less than about 100 μm at an effective plasma producing energy if not practical in the constraints of the geometries involved utilizing a focusing lens. As noted above, this is a characteristic of, e.g., a $CO_2$ laser, but $CO_2$ lasers may not e the only drive laser subject to this particular type of ineffectiveness. The drive laser redirecting mechanism may comprise a mirror. The focusing mirror may be positioned and sized to not block EUV light generated in a plasma produced at the plasma initiation site from the collector optical element outside of the aperture.

As noted above, this advantage may allow for the use of drive lasers like a $CO_2$ laser which may have other beneficial and desirable attributes, but are generally unsuitable for focusing with a focusing lens with the beam entering the collector aperture of a similar size as that occupied by the above described mirror focusing element in the aperture, according to aspects of an embodiment of the present invention.

The redirecting mechanism may be rotated and the focusing mirror may be heated. The apparatus and method may further comprise a seed laser system generating a combined output pulse having a pre-pulse portion and a main pulse portion; and an amplifying laser amplifying the pre-pulse portion and the main pulse portion at the same time without the pre-pulse portion saturating the gain of the amplifier laser. It will be understood by those skilled in the art that each of the pre-pulse and main pulse themselves may be comprised of a pulse of several peaks over its temporal length, which themselves could be considered to be a "pulse." Pre-pulse as used in the present Specification and appended claims is intended to mean a pulse of lesser intensity (e.g., peak and/or integral) than that of the main pulse and useful, e.g., to initiate plasma formation in the plasma source material, followed, then, by a larger input of drive laser energy into the forming plasma through the focusing of the main pulse on the plasma. This is regardless of the shape, duration, number of "peaks"/"pulses" in the pre-pulse of main pulse, or other characteristics of size, shape, temporal duration, etc. that could be viewed as forming more than one pulse within the pre-pulse portion and the main-pulse portion, either at the output of the seed pulse generator or within the combined pulse.

The amplifying laser may comprise a $CO_2$ laser. The pre-pulse portion of the combined pulse may be produced in a first seed laser and the main pulse portion of the combined pulse may be produced in s second seed laser or the pre-pulse and main pulse portions of the combined pulse may be produced in a single seed laser. The apparatus and method may further comprise a seed laser producing seed laser pulses at a pulse repetition rate X of at least 12 kHz, e.g., 18 kHz; and a plurality of N amplifier lasers, e.g., each being fired at a rate of X/N, e.g., 6 kHz for three PA, giving a total of 18 kHz, which may be positioned in series in an optical path of the seed laser pulses and each amplifying, in a staggered timing fashion, a respective Nth seed pulse are a pulse repetition rate of X/N. Each respective amplifier laser may be fired in time with the firing of the seed producing laser such that the respective Nth output of the seed producing laser is within the respective amplifier laser. The seed laser pulse may comprise a pre-pulse portion and a main pulse portion.

While the particular aspects of embodiment(s) of the LPP EUV Light Source Drive Laser System described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present LPP EUV Light Source Drive Laser System is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above the following could be implemented.

We claim:

1. An EUV light source comprising;

a laser device outputting a laser beam;

a material for interaction with the laser beam at an irradiation site to create an EUV light emitting plasma;

a beam delivery system directing the laser beam along an axis to the irradiation site, the system having a reflective optic centered on the axis and focusing said laser beam to a focal spot at the irradiation site; and wherein said source further comprises a vessel and a laser input window, and wherein the irradiation site is within the vessel and the window is distanced from the axis.

2. An EUV light source as recited in claim 1 wherein said laser device has a gain media comprising $CO_2$.

3. An EUV light source as recited in claim 2 wherein said material comprises tin.

4. An EUV light source as recited in claim 1 wherein said material comprises tin.

5. An EUV light source as recited in claim 1 wherein said source further comprises a vessel, the irradiation site is within the vessel and the reflective optic is positioned in the vessel.

6. An EUV light source as recited in claim 5 wherein said laser device has a gain media comprising $CO_2$ and said material comprises tin.

7. An EUV light source as recited in claim 1 wherein said reflective optic is a first reflective optic and said beam delivery system further comprises a second reflective optic.

8. An EUV light source as recited in claim 7 wherein said source further comprises a vessel, the irradiation site is within the vessel and the first and second reflective optics are positioned in the vessel.

9. An EUV light source as recited in claim 8 wherein said laser device has a gain media comprising $CO_2$ and said material comprises tin.

10. An EUV light source as recited in claim 1 wherein said source further comprises an elliptical mirror having a first focus on the axis at the irradiation site and a second focus on the axis, the optic positioned to interpose the first focus between the optic and the second focus.

11. An EUV light source as recited in claim 1 further comprising a mechanism to heat the optic.

12. An EUV light source as recited in claim 1 further comprising a mechanism to rotate the optic.

13. An EUV light source comprising;

a laser device outputting a laser beam;

a material for interaction with the laser beam at an irradiation site to create an EUV light emitting plasma;

a beam delivery system directing the laser beam along an axis to the irradiation site, the system having a reflective optic centered on the axis and focusing said laser beam to a focal spot at the irradiation site; and wherein the beam delivery system focuses the laser beam to a focal spot prior to reaching the reflective optic.

14. An EUV light source comprising:

a laser device outputting a laser beam;

a material for interaction with the laser beam at an irradiation site to create an EUV light emitting plasma;

a beam delivery system directing the laser beam along an axis to the irradiation site, the system having a reflective optic centered on the axis and focusing said laser beam to a focal spot at the irradiation site; and wherein the beam delivery system focuses the laser beam to a focal spot in the vessel prior to reaching the second reflective optic.

15. An EUV light source comprising; a vessel having a laser input window; a laser device having a gain media comprising $CO_2$, the device outputting a laser beam; a material containing tin disposed in the vessel for interaction with the laser beam at an irradiation site to create an EUV light emitting plasma, the plasma generating debris containing tin; an optic for reflecting the laser beam to the irradiation site, the optic positioned in the vessel and exposed to the debris containing tin; and wherein said reflective optic is a first reflective optic and said light source further comprises a second reflective optic.

16. An EUV light source as recited in claim 15 wherein the second reflective optic is positioned in the vessel.

17. An EUV light source as recited in claim 16 wherein the optic directs the laser beam along an axis to the irradiation site and said source further comprises an elliptical mirror having a first focus on the axis at the irradiation site and a second focus on the axis, the first optic positioned to interpose the first focus between the first optic and the second focus and the second optic positioned along the axis to interpose the first focus between the first optic and the second optic.

18. An EUV light source as recited in claim 15 further comprising a mechanism to heat the optic.

19. An EUV light source comprising; a vessel having a laser input window; a laser device having a gain media comprising $CO_2$, the device outputting a laser beam; a material containing tin disposed in the vessel for interaction with the laser beam at an irradiation site to create an EUV light emitting plasma, the plasma generating debris containing tin; an optic for reflecting the laser beam to the irradiation site, the optic positioned in the vessel and exposed to the debris containing tin; and wherein the optic directs the laser beam along an axis to the irradiation site and said source further comprises an elliptical mirror having a first focus on the axis at the irradiation site and a second focus on the same axis, the optic positioned to interpose the first focus between the optic and the second focus.

20. An EUV light source comprising:

a vessel having a laser input window;

a laser device having a gain media comprising $CO_2$, the device outputting a laser beam;

a material containing tin disposed in the vessel for interaction with the laser beam at an irradiation site to create an EUV light emitting plasma, the plasma generating debris containing tin;

an optic for reflecting the laser beam to the irradiation site, the optic positioned in the vessel and exposed to the debris containing tin; and further comprising a mechanism to rotate the optic.

21. An EUV light source comprising:

a vessel having a laser input window;

a laser device having a gain media comprising $CO_2$, the device outputting a laser beam;

a material containing tin disposed in the vessel for interaction with the laser beam at an irradiation site to create an EUV light emitting plasma, the plasma generating debris containing tin;

an optic for reflecting the laser beam to the irradiation site, the optic positioned in the vessel and exposed to the debris containing tin; and further comprising a system to focus the laser beam to a focal spot prior to reaching the reflective optic.

22. An EUV light source comprising;

a vessel having a laser input window;

a laser device having a gain media comprising $CO_2$, the device outputting a laser beam;

a material containing tin disposed in the vessel for interaction with the laser beam at an irradiation site to create an EUV light emitting plasma, the plasma generating debris containing tin;

an optic for reflecting the laser beam to the irradiation site, the optic positioned in the vessel and exposed to the debris containing tin; and further comprising a system to focus the laser beam to a focal spot in the vessel prior to reaching the reflective optic.

23. An EUV light source comprising;

a vessel having a laser input window;

a laser device having a gain media comprising $CO_2$, the device outputting a laser beam;

a material containing tin disposed in the vessel for interaction with the laser beam at an irradiation site to create an EUV light emitting plasma, the plasma generating debris containing tin;

an optic for reflecting the laser beam to the irradiation site, the optic positioned in the vessel and exposed to the debris containing tin; and wherein the optic directs the laser beam along an axis to the irradiation site and said window is distanced from the axis.

24. An EUV light source comprising;

a vessel having a laser input window;

a laser device having a gain media comprising $CO_2$, the device outputting a laser beam;

a material containing tin disposed in the vessel for interaction with the laser beam at an irradiation site to create an EUV light emitting plasma, the plasma generating debris containing tin;

an optic for reflecting the laser beam to the irradiation site, the optic positioned in the vessel and exposed to the debris containing tin; and wherein the source further comprises an elliptical mirror having a first focus at the irradiation site and the optic directs the laser beam to the elliptical mirror for reflection therefrom toward the irradiation site.

25. An EUV light source comprising;

a vessel having a laser input window;

a laser device having a gain media comprising $CO_2$, the device outputting a laser beam;

a material containing tin disposed in the vessel for interaction with the laser beam at an irradiation site to create an EUV light emitting plasma, the plasma generating debris containing tin;

an optic for reflecting the laser beam to the irradiation site, the optic positioned in the vessel and exposed to the debris containing tin; and wherein the optic is flat.

26. An EUV light source as recited in claim 25 further comprising a mechanism to heat the optic.

27. An EUV light source as recited in claim 25 further comprising a mechanism to rotate the optic.

28. An EUV light source as recited in claim 25 further comprising a system to focus the laser beam to a focal spot in the vessel prior to reaching the reflective optic.

29. An EUV light source comprising;

a vessel having a laser input window;

a laser device outputting a laser beam;

a material disposed in the vessel for interaction with the laser beam at an irradiation site to create an EUV light emitting plasma, the plasma generating debris; and a system delivering the laser beam along an axis to the irradiation site, and wherein the window is distanced from the axis at a position such that debris cannot reach the window along a direct path from the irradiation site.

30. An EUV light source as recited in claim 29 wherein said laser device has a gain media comprising $CO_2$.

31. An EUV light source as recited in claim 30 wherein said material comprises tin.

32. An EUV light source as recited in claim 29 wherein said material comprises tin.

33. An EUV light source as recited in claim 29 wherein a reflective optic is positioned in the vessel.

34. An EUV light source as recited in claim 33 wherein said laser device has a gain media comprising $CO_2$ and said material comprises tin.

35. An EUV light source as recited in claim 33 wherein said reflective optic is a first reflective optic and said source further comprises a second reflective optic positioned in the vessel.

36. An EUV light source as recited in claim 35 wherein said source further comprises an elliptical mirror having a first focus on the axis at the irradiation site and a second focus on the axis, the first optic positioned to interpose the first focus between the first optic and the second focus and the second optic positioned along the axis to interpose the first focus between the first optic and the second optic.

37. An EUV light source as recited in claim 29 wherein said source further comprises an elliptical mirror having a first focus on the axis at the irradiation site and a second focus on the axis, the optic positioned to interpose the first focus between the optic and the second focus.

38. An EUV light source as recited in claim 29 further comprising a mechanism to heat the optic.

39. An EUV light source as recited in claim 29 further comprising a mechanism to rotate the optic.

40. An EUV light source as recited in claim 29 wherein the beam delivery system focuses the laser beam to a focal spot prior to reaching the reflective optic.

41. An EUV light source as recited in claim 40 further comprising a laser delivery enclosure protecting said window.

42. An EUV light source as recited in claim 41 wherein said laser delivery enclosure comprises a conical shaped enclosure.

43. An EUV light source comprising;

a laser device outputting a laser beam;

a material for interaction with the laser beam at an irradiation site to create an EUV light emitting plasma;

a beam delivery system directing the laser beam along an axis to the irradiation site, the system having a reflective optic centered on the axis and focusing said laser beam to a focal spot at the irradiation site; and wherein said source further comprises an elliptical mirror having a first focus on the axis at the irradiation site and a second focus on the axis, the first optic positioned to interpose the first focus between the first optic and the second focus and the second optic positioned along the axis to interpose the first focus between the first optic and the second optic.

* * * * *